US007400722B2

(12) United States Patent
Qi et al.

(10) Patent No.: US 7,400,722 B2
(45) Date of Patent: Jul. 15, 2008

(54) METHODS AND APPARATUS FOR PERFORMING HASH OPERATIONS IN A CRYPTOGRAPHY ACCELERATOR

(75) Inventors: Zheng Qi, Milpitas, CA (US); Ronald Squires, Castro Valley, CA (US); Mark Buer, Gilbert, AZ (US); David K. Chin, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 706 days.

(21) Appl. No.: 10/330,694

(22) Filed: Dec. 24, 2002

(65) Prior Publication Data

US 2003/0185391 A1 Oct. 2, 2003

Related U.S. Application Data

(60) Provisional application No. 60/368,583, filed on Mar. 28, 2002.

(51) Int. Cl.
*H04L 9/00* (2006.01)
(52) U.S. Cl. .................. 380/28; 380/44; 713/189; 713/193
(58) Field of Classification Search ............. 713/151, 713/153, 160–161, 168, 170, 189, 193; 726/2, 726/14; 380/28, 30, 44; 705/67
See application file for complete search history.

(56) References Cited

U.S. PATENT DOCUMENTS 5,265,164 A * 11/1993 Matyas et al. ............ 380/30
5,949,881 A * 9/1999 Davis ..................... 713/189
6,694,436 B1 * 2/2004 Audebert ..................... 726/9
6,983,366 B1 * 1/2006 Huynh et al. ............ 713/168
7,024,695 B1 * 4/2006 Kumar et al. ............. 726/26
2002/0097724 A1 * 7/2002 Halme et al. ............ 370/392
2002/0191791 A1 * 12/2002 Anand ..................... 380/255
2003/0058274 A1 * 3/2003 Hill et al. ................. 345/751
2003/0084309 A1 * 5/2003 Kohn ....................... 713/189

FOREIGN PATENT DOCUMENTS

WO WO 01/61912 A1 8/2001

OTHER PUBLICATIONS

Deepakumara et al., FPGA Implementation of MD5 Hash Algorithm, Electrical and Computer Engineering, 2001. Canadian Conference on vol. 2, May 13-16, 2001, pp. 919-924.*
Jiang et al., Securing Web Servers Against Insider Attack, Computer Security Applications Conference, 2001. ACSAC 2001. Proceedings 17th annual, Dec. 10-14, 2001, pp. 265-276.*
Thomas A Stephen, SSL and TLS Essentials Securing the Web, 2000, pp. 4-6, 41-45, 96-104.*

* cited by examiner

*Primary Examiner*—Minh Dieu Nguyen
(74) *Attorney, Agent, or Firm*—Sterne, Kessler, Goldstein & Fox P.L.L.C

(57) ABSTRACT

Methods and apparatus are provided for implementing a cryptography accelerator for performing operations such as hash operations. The cryptography accelerator recognizes characteristics associated with input data and retrieves an instruction set for processing the input data. The instruction set is used to configure or control components such as MD5 and SHA-1 hash cores, XOR components, memory, etc. By providing a cryptography accelerator with access to multiple instruction sets, a variety of hash operations can be performed in a configurable cryptographic accelerator.

32 Claims, 10 Drawing Sheets

METHODS AND APPARATUS FOR PERFORMING HASH OPERATIONS IN A CRYPTOGRAPHY ACCELERATOR

CROSS REFERENCE TO RELATED APPLICATIONS

This application claims priority under U.S.C. 119(e) from U.S. Provisional Application No. 60/368,583, entitled "Methods And Apparatus For Implementing A Configurable Authentication Accelerator," as of filing on Mar. 28, 2002, the disclosure of which is herein incorporated by reference for all purposes.

BACKGROUND OF THE INVENTION

1. Field of the Invention

The present application relates to implementing a cryptography accelerator. More specifically, the present application relates to methods and apparatus for providing a configurable cryptography accelerator with instruction sets for performing hash operations on input data.

2. Description of Related Art

Conventional software and hardware designs for performing hash operations are inefficient. One technique for securing a communication channel between two network entities such as a client and a server specifies that the two entities perform a cryptography handshake sequence. During the cryptographic handshake sequence, the two network entities will typically perform various cryptographic operations such as encryption and authentication operations to verify the identity of the other and to exchange information to establish a secure channel.

In one example, session keys are exchanged after the identity of the other network entity is verified. However, both software, firmware and hardware techniques for performing hash operations, such as hash operations used in cryptography handshake sequences, have been inefficient and resource intensive. Cryptography handshake sequences and hash algorithms are described in Applied Cryptography, Bruce Schneler, John Wiley & Sons, Inc. (ISBN 0471128457), incorporated by reference in its entirety for all purposes.

It is therefore desirable to provide methods and apparatus for improving hash operations with respect to some or all of the performance limitations noted above.

SUMMARY OF THE INVENTION

Methods and apparatus are provided for implementing a cryptography accelerator for performing operations such as hash operations. The cryptography accelerator recognizes characteristics associated with input data and retrieves an instruction set for processing the input data. The instruction set is used to configure or control components such as MD5 and SHA-1 hash cores, XOR components, memory, etc. By providing a cryptography accelerator with access to multiple instruction sets, a variety of hash operations can be performed in a configurable cryptographic accelerator.

According to various embodiments, a cryptography accelerator for performing hash operations is provided. The accelerator includes a first hash core, a persistent memory, and a temporary memory. The first hash core is operable to perform a plurality of rounds of hash computations on input data to derive processed data. A persistent memory contains a plurality of instruction sets. The plurality of instruction sets provide information for the first hash core on operations to perform on input data and intermediate data during the plurality of rounds of hash computations. The temporary memory is coupled to the first hash core. The temporary memory is operable to hold input data and intermediate data.

According to other embodiments, a method for performing hash operations is provided. Input data is received. Characteristics associated with the input data are determined. An instruction set for performing hash operations on input data is selected. The instruction set is selected from a plurality of instruction sets maintained in persistent memory associated with a first hash core. The first hash core is configured using the instruction set. The first hash core is operable to perform hash operations on input data based on the instruction set.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Figure 1:
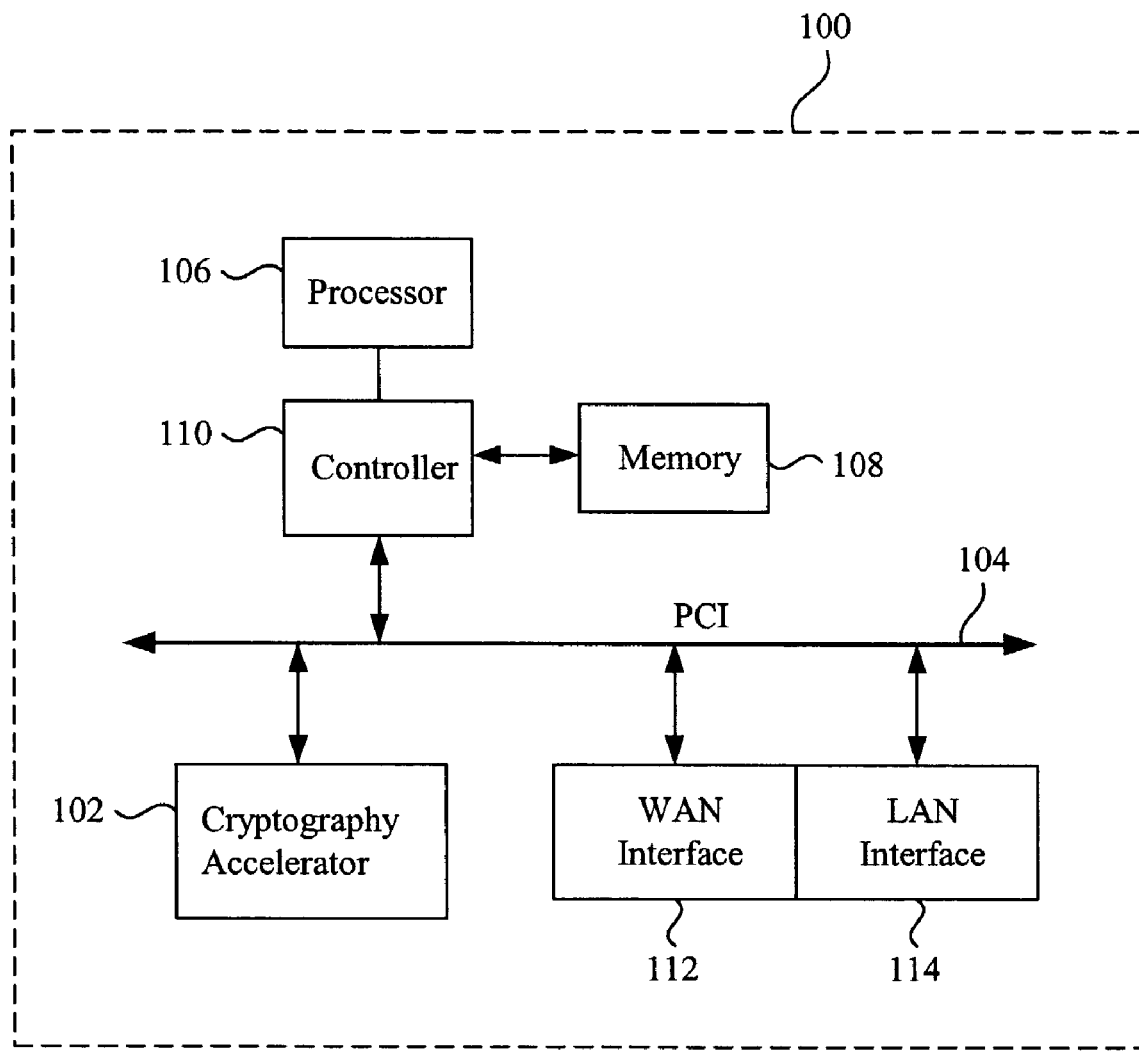
FIG. 1 is a diagrammatic representation of a system that can use the techniques of the present invention.

The present application relates to implementing a cryptography accelerator. More specifically, the present application relates to methods and apparatus for providing a cryptography accelerator capable of performing a variety of different hash operations on input data.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of the SHA-1 and MD5 hash algorithms. However, it should be noted that the techniques of the present invention can be applied to a variety of different hash operations for cryptography processing in general. In the following description, numerous specific details are set forth in order to provide a thorough understanding of the present invention. The present invention may be practiced without some or all of these specific details. In other instances, well known process operations have not been described in detail in order not to unnecessarily obscure the present invention.

A wide variety of algorithsm are used for encryption and authentication operations. In many conventional implementations, software is used to identify the type of data and the cryptographic processing needed for the particular data sequence. However, cryptographic operations implemented entirely in software on a generic processor such as a reduced instruction set (RISC) or complex instruction set (CISC) processors are highly inefficient. In many environments, it is beneficial to use specialized accelerators for performing cryptographic operations, such as DES and SHA-1 operations. In typical cryptography accelerator implementations, a cryptography accelerator is configured to perform resource intensive cryptographic operations while software through an external host is configured to perform sequencing. That is, software formats and sequences data and makes function calls to elementary cryptographic operators. In one example, a cryptography accelerator would be responsible for executing a function such as cryptooperation (data, key1, key2) while the software would be responsible for formatting the data properly, acquiring the keys, and making multiple calls to the function when necessary.

More recent efforts have focused on implementing both core processing as well as formatting and sequencing on a cryptography accelerator. In one example, software running on a host such as a CPU external to a cryptography accelerator could simply forward a packet to the cryptography accelerator. Using the packet, the cryptography accelerator would extract information to determine what type of processing and how many rounds of processing need to be performed.

One technique for implementing such a cryptography accelerator that performs both cryptography processing and sequencing uses state tables. Each load or store instruction on the cryptography accelerator is represented by one or more states. However, because many variations in cryptographic algorithms exist, a large number of states exist. Having a significant number of states makes implementation and verification extremely difficult. Furthermore, if a new cryptographic algorithm is developed, substantial work would have to be performed in order to update the states associated with the instructions.

Consequently, the techniques of the present invention provide sequences of instructions for performing cryptographic as well as sequencing operations on data. Instruction sequences can relatively easily be implemented for particular cryptographic operations. When a new algorithm is developed, an additional instruction sequence can be provided on the cryptography accelerator. The variations between cryptographic algorithms can be handled with relative ease. The techniques and mechanisms of the present invention allow for a cryptographic accelerator that has the speed and processing advantages of a customized piece of hardware while retaining the flexibility of a piece of software.

FIG. 1 is a diagrammatic representation of one example of a processing system 100 with a cryptography accelerator according to various embodiments of the present invention. As shown in FIG. 1, the present invention may be implemented in a stand-alone cryptography accelerator 102 or as part of the system 100. In the described embodiment, the cryptography accelerator 102 is connected to a bus 104 such as a PCI bus via a standard on-chip PCI interface. The processing system 100 includes a processing unit 106 and a system memory unit 108. The processing unit 106 and the system memory unit 108 are coupled to the system bus 104 via a bridge and memory controller 110.

According to various embodiments, the processing unit 106 may be the central processing unit (CPU) of a system 100. In one example, a LAN interface 114 is provided to couple the processing system 100 to a local area network (LAN) to allow packet receipt and transmission. Similarly, a Wide Area Network (WAN) interface 112 can also be provided to connect the processing system to a WAN (not shown) such as the Internet. The WAN interface manages in-bound and out-bound packets, providing automatic cryptographic processing for IP packets.

In many implementations, the cryptography accelerator 102 is an application specific integrated circuit (ASIC) coupled to the processor 106. However, the cryptography accelerator 102 can also be a programmable logic device (PLD), field programmable gate array (FPGA), or other device coupled to the processor 106. According to specific embodiments, the cryptography accelerator 102 is implemented either on a card connected to the bus 104 or as a standalone chip integrated in the system 100.

In other embodiments, the cryptography accelerator 102 itself is integrated into the processing core of a CPU of system 100, such as that available from Tensilica Corporation of Santa Clara, Calif. or ARC Cores of San Jose, Calif. In another embodiment, techniques and mechanisms of the present invention are integrated into a CPU such as a CPU available from Intel Corporation of San Jose, Calif. or AMD Corporation of Sunnyvale, Calif. By implementing cryptography accelerator functionality entirely on the processor 106, a separate card or chip in the system 100 is not needed. In still other embodiments, the processing system 100 including the cryptography accelerator 102 is implemented as a system on a chip (SOC). The network interfaces, memory, processing core, and cryptography accelerator functionality are provided on a single integrated circuit device.

The cryptography accelerator 102 is capable of implementing various network security standards, such as Internet Protocol Security (IPSec), Secure Sockets Layer/Transport Layer Security (SSL/TLS), Internet Key Exchange (IKE) which provide application-transparent encryption and authentication services for network traffic.

Network security standards such as IPsec and SSL/TLS provide authentication through the use of hash algorithms. Two commonly used hash algorithms are MD5 and the Secure Hash algorithm (SHA-1). Other hash algorithms such as MD4 and MD2 are also available. Hash algorithms are described in Applied Cryptography, Bruce Schneier, John Wiley & Sons, Inc. (ISBN 0471128457), incorporated by reference in its entirety for all purposes. Even though many network security standards apply the same hash algorithms, different approaches are taken toward applying the hash algorithms to the actual authentication computation.

Different versions of the same network security standards even vary approaches toward applying the hash algorithms. In IPsec, several approaches such as HMAC-MD5-96 and HMAC-SHA1-96 based on the hash message authentication code (HMAC) algorithm are provided. The approaches HMAC-MD5-96 and HMAC-SHA1-96 are described in RFC 2403 and RFC 2404 respectively, while the HMAC algorithm is described in RFC 2104, the entireties of which are incorporated by reference for all purposes. SSL/TLS use similar, but slightly different approaches. In SSLv3, an earlier version of HMAC is used. In TLS 1.0, the same version of HMAC is used as in IPsec, but a different number of bits are taken for the full result.

The TLS 1.0 protocol is described in RFC 2246, the entirety of which is incorporated by reference for all purposes. SSL is described in E. Rescorla, SSL and TLS: Designing and Building Secure Systems (Addison-Wesley, 2001) and S. A. Thomas, SSL & TLS Essentials: Securing the Web (John Wiley & Sons, Inc. 2000), the entireties of which are incorporated by reference for all purposes. In addition, SSL/TLS define a set of functions using a combination of HMAC, MD5, and SHA1 to generate processed data. For example, combinations are used to generate a master secret sequence from a premaster secret sequence, to generate key blocks from a master secret sequence, or to perform hash operations for finished message processing and client certificate verification.

Typical cryptography accelerators use hash cores for performing hash operations. When a client or server participates in an authentication sequence such as a key exchange, clients and servers need cryptography accelerators specifically configured for particular versions of specified network security standards. In one example, if the server needs to perform TLS 1.0 operations, a cryptography accelerator such as an ASIC specifically microcoded with a TLS 1.0 instruction set would be required. A state machine can be used to perform operations associated with each network security standard version. As noted above, however, a state machine that can handle the number of standards in existence would be extremely complicated and difficult to implement.

Consequently, many cryptography accelerators typically contain only functionality for performing basic hash operations such as MD5 or SHA1 operations. Authentication specific functionality on a cryptography accelerator is often limited to MD5 or SHA1 hash cores. The external processor such as an external CPU would pass data to a cryptography accelerator when MD5 or SHA1 processing was needed. In one example, if a network security standard specified repeated calls to a MD5 or SHA1 function, the external processor would pass data to the cryptography accelerator during each function call, receive data output by the cryptography accelerator, and alter data as needed before passing the data back to the cryptography accelerator for another function call.

Typically, only a single hash function call would be performed on data before sending the data back to an external processor. In another example, if XOR operations were specified for data output from the MD5 and SHA1 cores, the external processor would perform the XOR operations even if the XOR operations were a specific part of the cryptographic processing. Because of inefficiencies such as the passing of data between the external processor and the cryptography accelerator between function calls, cryptographic processing for a server or client expecting many different versions of network security protocols has been limited.

The techniques of the present invention, however, provide not only for a cryptography accelerator specifically configured for a particular type of hash operations without the need to send and receive data to an external processor between various calls to a particular function implemented on a chip, the techniques of the present invention provide an automatically configurable cryptography accelerator that recognizes characteristics of the input data and automatically performs cryptographic processing such as SSLv3 or TLS 1.0 key derivation.

It should be noted that recognizing characteristics of the input data can include operations such as analyzing the input data, retrieving information associated with the input data, or recognizing characteristics of instruction sequences associated with the input data. A single cryptographic accelerator, for example, with an MD5 and a SHA1 core can perform cryptographic processing associated with a variety of operations using the MD5 and SHA1 hash operations. In one example, the cryptography accelerator can perform cryptographic operations associated with IPsec and SSL/TLS processing.

Figure 2A:
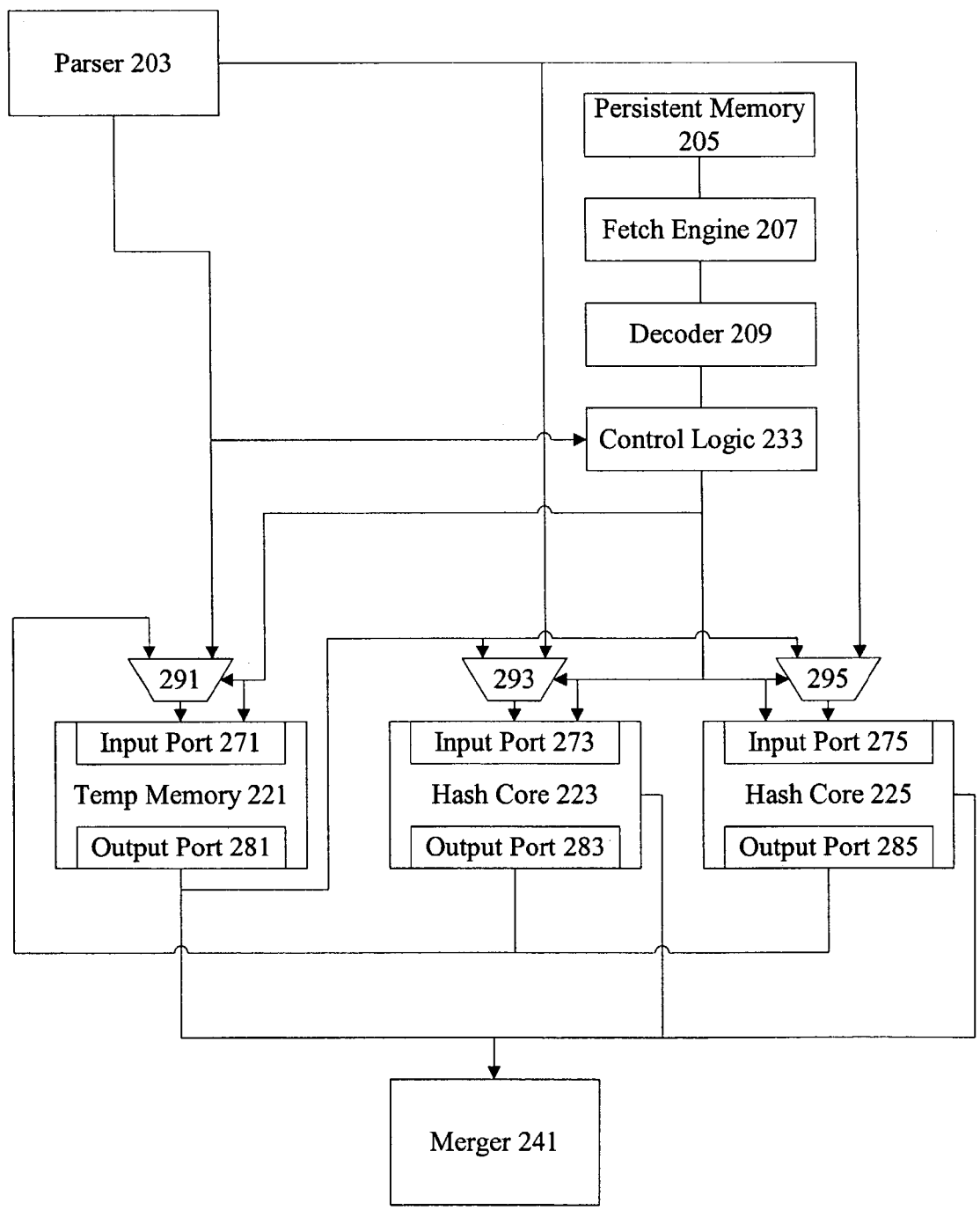
FIG. 2A is a diagrammatic representation of an integrated circuit containing a processing core for performing hash operations.

FIG. 2A is a diagrammatic representation of one example of a cryptography accelerator according to various embodiments. The cryptography accelerator includes an interface having a parser 203 coupled to an entity such as external processor for receiving and delineating input data sequences. In one example, the parser 203 receives a data sequence associated with SSLv3 key derivation. The control logic 233 determines that key derivation operations associated with SSLv3 should be performed on the data sequence. The control logic 233 retrieves an instruction set associated with SSLv3 key derivation from persistent memory 205. Memory that retains data after hash operations are completed is referred to herein as persistent memory. Persistent memory also typically remains intact when power is disconnected. In one embodiment, persistent memory is a read-only memory (ROM) on a cryptography accelerator chip, although persistent memory can also be components such as flash memory. In another embodiment, persistent memory 205 and temporary memory 221 are contained in the same component. A component such as a random access memory (RAM) can be loaded with instruction sets and can provide the capability to function as both a persistent memory and as a temporary memory, although such access may be slow.

According to various embodiments, persistent memory 205 includes a table with various types of operations and security protocols identified in the entries. The entries correspond to instruction sets for configuring the cryptography accelerator. Logic and mechanisms for configuring a cryptography accelerator for performing a particular type of cryptographic operation such as key derivation or finished message processing is referred to herein as an instruction set. The fetch engine 207 retrieves the instruction set from persistent memory 205. According to various embodiments, the decoder 209 receives and interprets the instruction set for control logic 233. In one embodiment, control logic 233 retrieves microcode for performing cryptographic operations on an input data sequence. Logic and mechanisms for configuring or managing components such as hash cores for authentication processing is herein referred to as control logic. In one example, control logic manages cryptographic processing in components such as hash core 223, hash core 225, and temporary memory 221.

In one embodiment, hash cores 223 and 225 as well as temporary memory 221 also receive input data from parser 203. After a round of processing in hash core 223 or hash core 225, data can be provided to temporary memory 221. Input data that has undergone one or more rounds of hash operations is referred to herein as intermediate data. Temporary memory 221 can store the intermediate data and subsequently provide the intermediate data for additional rounds of hash processing through output port 281 to the input ports 273 and 275 associated with hash cores 223 and 225. According to various embodiments, hash cores 223 and 225 both are capable of performing either MD5 or SHA-1 processing. After the specified number of rounds of hash processing have occurred as determined by the control logic 233, hash cores 223 and 225 can provide the final or processed data through output port 283 and 285 to merger component 241. Merger component 241 can then send the processed data to the external entity.

According to various embodiments, components for performing other operation such as XOR operations are also included in the cryptography accelerator. In one example, the XOR component is coupled to the output ports 283 and 285 so that SHA-1 and MD5 processed data can be combined together. It should be noted that the cryptography accelerator can include a number of other components including cryptography blocks such as DES, triple DES, and RC4 cores. The cryptography accelerator can include encryption functionality, central processing cores, bypass circuitry, etc.

Figure 2B:
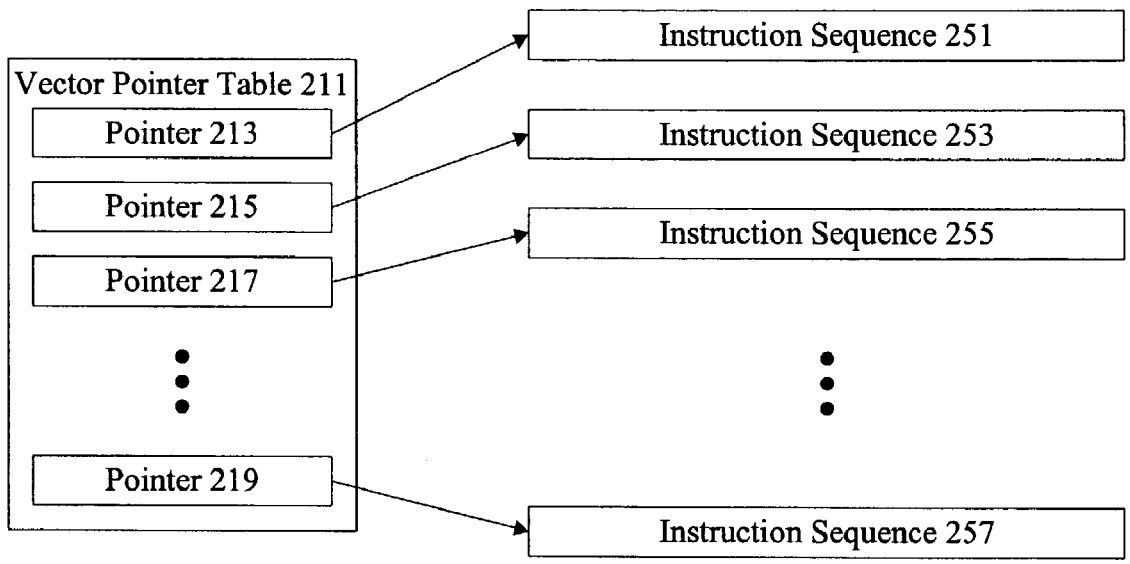
FIG. 2B is a diagrammatic representation showing a structure referencing instruction sequences.

FIG. 2B is a diagrammatic representation providing one example on an instruction sequence is provided to control logic 233. In one example, a parser loads a program counter with a pointer from a vector pointer table 211. Each pointer 213, 215, 217, and 219 may be configured to refer to an instruction sequence 251, 253, 255, and 257. According to various embodiments, each instruction sequence is a sequence of loads, stores, moves, sets, etc., for performing cryptographic operations. In one example, the fetch engine gets the sequence of instructions from persistent memory as long as there is room in an instruction queue. The instructions are decoded in order to determine resource dependencies to allow instructions to be executed out of order. According to various embodiments, several hash engines are provided in a cryptographic accelerator and instructions are performed as resources become available. Consequently, mechanisms are provided to track the resource dependencies. In some examples, resources include memory ports, hash engine ports, and counters.

Figure 2C:
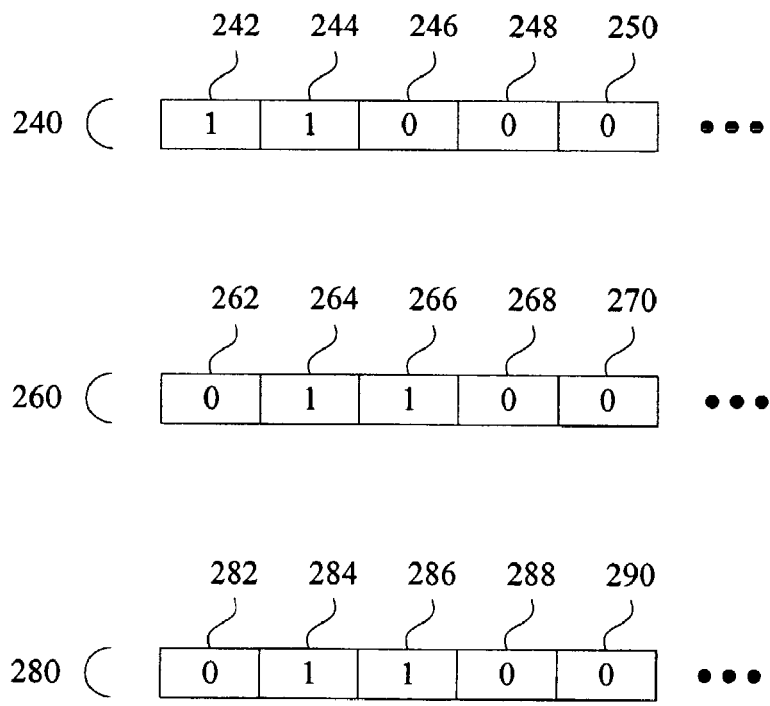
FIG. 2C is a diagrammatic representation of mechanisms for determining resource dependencies.

FIG. 2C is a diagrammatic representation of one example of a mechanism for tracking resource dependencies. According to various embodiments, global resource vector 240 indicates which resources are being used. In one example, resource 242 represents a memory input port being used and resource 244 represents a hash engine input port that is in use. Dependency vector 260 shows which resources are needed for a particular instruction in an instruction sequence. In one example, resource 264 and 266 represent the hash engine input port and the hash engine output port are needed for the instruction to execute. Consequently, the instruction may not execute until the global resource vector returns to a state shown in vector 280, when resource 284 and 286 representing the hash engine input and output ports become available.

Figure 3:
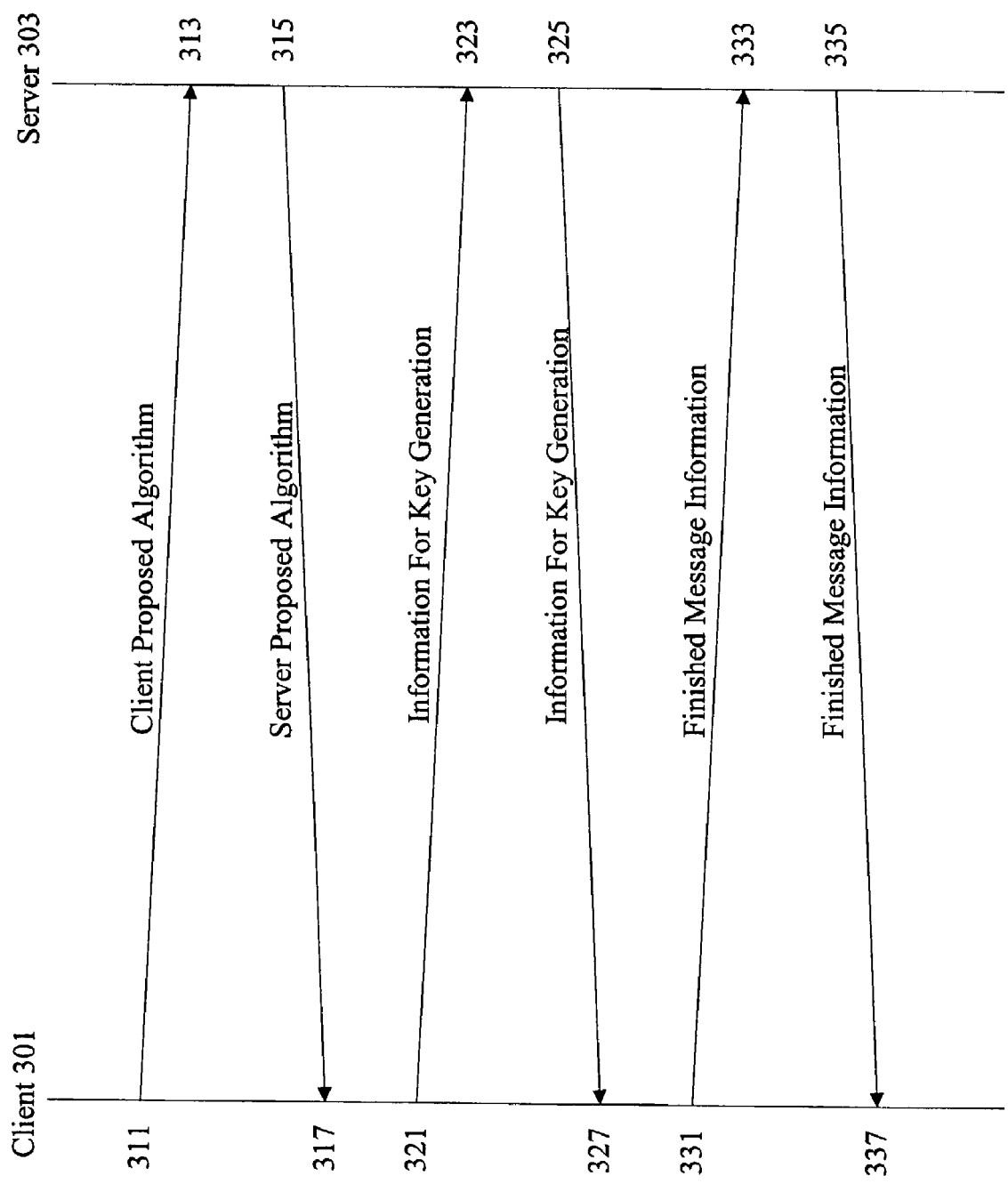
FIG. 3 is an interaction diagram showing a sequence in which the techniques of the present invention can be applied.

FIG. 3 shows one example of a cryptographic handshake sequence between a client 301 and a server 303. A wide variety of cryptographic handshake sequences associated with key exchanges are available. FIG. 3 is merely one example of a handshake. At 311, the client 301 transmits a message with a security enable parameter to a server 303. The authentication message contains an identifier such as a user name or an authentication identifier that allows the receiver to select an authentication mechanism out of a possible set of mechanisms. According to various embodiments, server 303 already has information associated with the client. The server 303 identifies the security enable parameter along with any client proposed algorithms and transmits an acknowledgement at 315 to client 301 indicating the selection of an algorithm.

As noted above, a client 301 transmits a user name to a server 303 and a server 303 at 315 transmits a value such as a salt associated with the user name back to the client 301. According to other embodiments, protocol version, session ID, cipher suite, and compression method are exchanged along with a client random value and a server random value.

At 317, client 301 computes the combined hash using the salt and the actual password associated with the user name. According to various embodiments, the client 301 then provides public information at 321 to server 303. Similarly, server 303 at 325 provides public information to client 301. Information that would not compromise security between a client and a server if accessed by a third party is referred to herein as public information. At 327, both client 301 and server 303 can derive a common value such as a common symmetric key using values available to each of them. Many techniques for key derivation are available. According to various embodiments, a cryptographic accelerator with hash cores according to various embodiments are capable or deriving keys based on selected algorithms in a highly efficient manner.

For example, client 301 generates a common key using public information from server 303, its own private information used to generate public information provided to server 303, and the combined hash calculated by operating on the password appended to a salt. Similarly, server 303 generates a symmetric key by using public information from client 301, a verifier derived from the hash of the combined salt and password, and private information used to generate public information provided to client 301. If the password used to derive the verifier at server 303 is the same as the password used to generate the combined hash value at client 301, the symmetric keys derived at client 301 and server 303 will be the same.

According to various embodiments, the session key can be used for communications between client 301 and server 303. It should be noted that a variety of different cryptographic handshake sequences and communication sequences in general can use the techniques of the present invention. For example, a session key can further be hashed to derive a possibly stronger session key.

At 331, client 301 sends a hash of the session key combined with other public information to server 303. The server 303 then performs a hash of the derived session key combined with the other information known to server 303 to verify the identity of the client 301. Similarly, at 335, server 303 sends a hash of the session key along with other information known to client 301 to allow client 301 to verify the identify of server 303. According to various embodiments, a cryptography accelerator with hash cores according to the techniques of the present invention makes generation of finished messages highly efficient.

It should be noted that in the above implementation, a password is never transmitted over the network. Instead, both network entities use derivatives of the password to generate the session key and other cryptographic information used for secure transmission. Both the password and the session key need not ever be transmitted over the network.

According to various embodiments, a cryptography accelerator speeds operations such as key derivation and finished message generation on both the server and the client side. It is contemplated that a cryptography accelerator can be used in any network entity. It should be noted that the cryptographic handshake sequence shown in FIG. 3 is only one example of a sequence that can use the mechanisms and techniques of the present invention.

Figure 4:
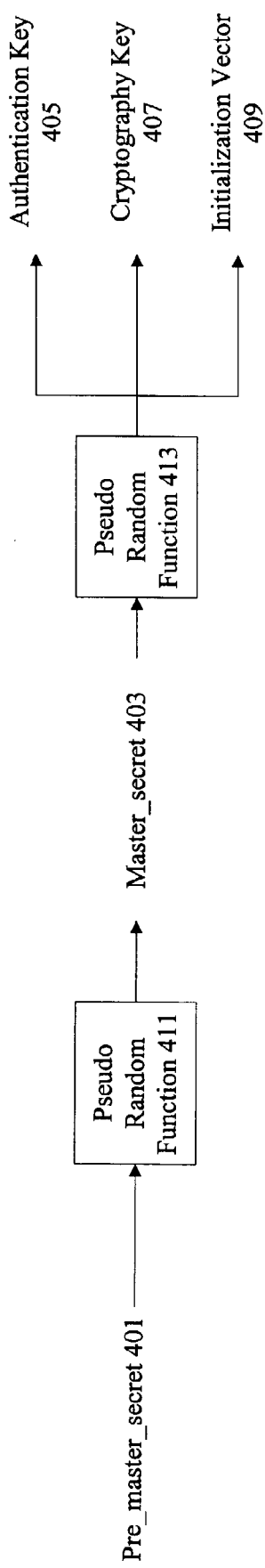
FIG. 4 is a diagrammatic representation showing input data, intermediate data, and processed data.

FIG. 4 is a diagrammatic representation showing data processing according to various embodiments. In one embodiment, a premaster secret 401 is associated with input data provided to a cryptography accelerator. The cryptography accelerator is used to apply a pseudo-random function (PRF)

411 to the premaster secret 401 to derive a master secret 403. A function that takes one or more inputs and derives an indeterminate output is referred to herein as a pseudo-random function. A master secret 403 corresponds to intermediate data. Another pseudo-random function 413 can be applied to the master secret 403 to derive final or processed data such as authentication keys 405, cryptography keys 407, or initialization sectors 409. The final data generated varies depending on the protocol, protocol version, and type of processing requested.

Figure 5:
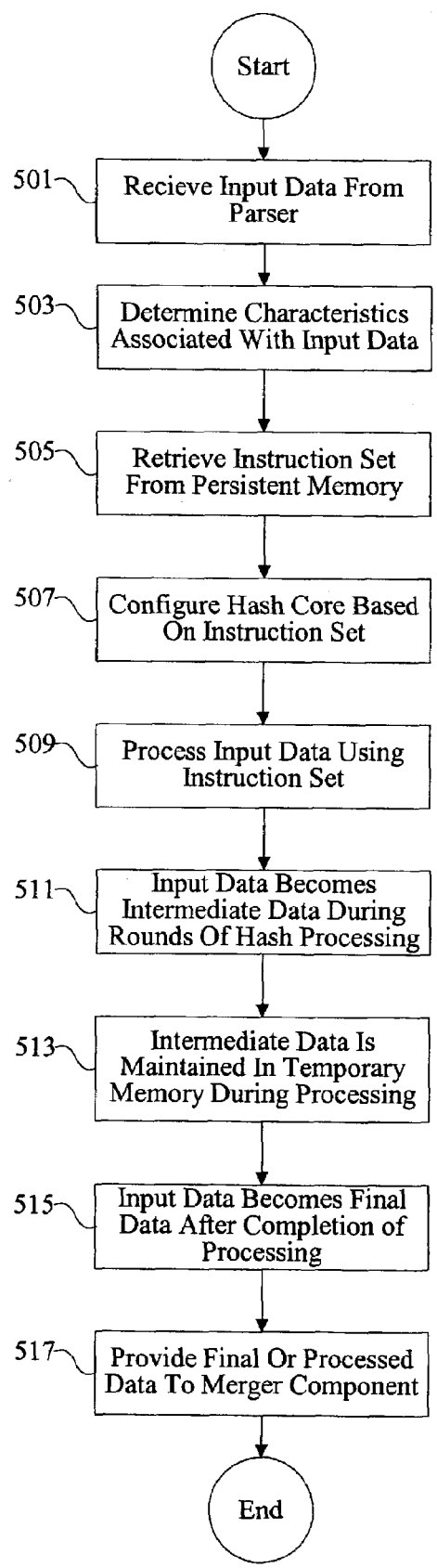
FIG. 5 is a flow process diagram showing techniques for selecting an instruction set.

FIG. 5 is a flow process diagram showing one example of a technique for configuring components such as hash cores in a cryptography accelerator. At 501, input data is received from a component such as parser. According to various embodiments, a parser organizes the data into a form readable by a hash core. At 503, characteristics associated with the input data are determined. Information associated with how to process input data is referred to herein as characteristics of input data. Input data can include information such as protocol version, session ID, cipher suite, and compression method. In one example it is determined what algorithm is being applied to the input data. Algorithms can include versions of TLS, SSL, and IKE as well as other protocols and variants to the protocols.

Determining characteristics can also include determining what kind of operation is to be applied to the data. For example, a key may need to be derived from the data or finished message processing may need to be performed. At 505, an instruction set is retrieved from persistent memory based on the characteristics associated with the input data. Persistent memory may include multiple instruction sets for configuring processing of input data in a variety of manners. At 507, a hash core is configured based on the instruction set. It should be noted that other components such as XOR processing components and temporary memory may also be configured at this point.

Configuring the components may include loading microcode associated with the instruction set into control logic associated with the various hash cores and configurable components. Alternatively, instructions such as microcode can be loaded into a single control logic component associated with the various components. At 509, input data is processed using the instruction set. After a round of processing, input data becomes intermediate data. At 513, intermediate data is maintained in temporary memory during processing. Using temporary memory, data can be manipulated, padded, truncated, etc. At 515, input data and intermediate data finally become final or processed data after completion of processing at 515. The final or processed data is provided back to a merger component for forwarding to an external entity such as an external processor.

Figure 6:
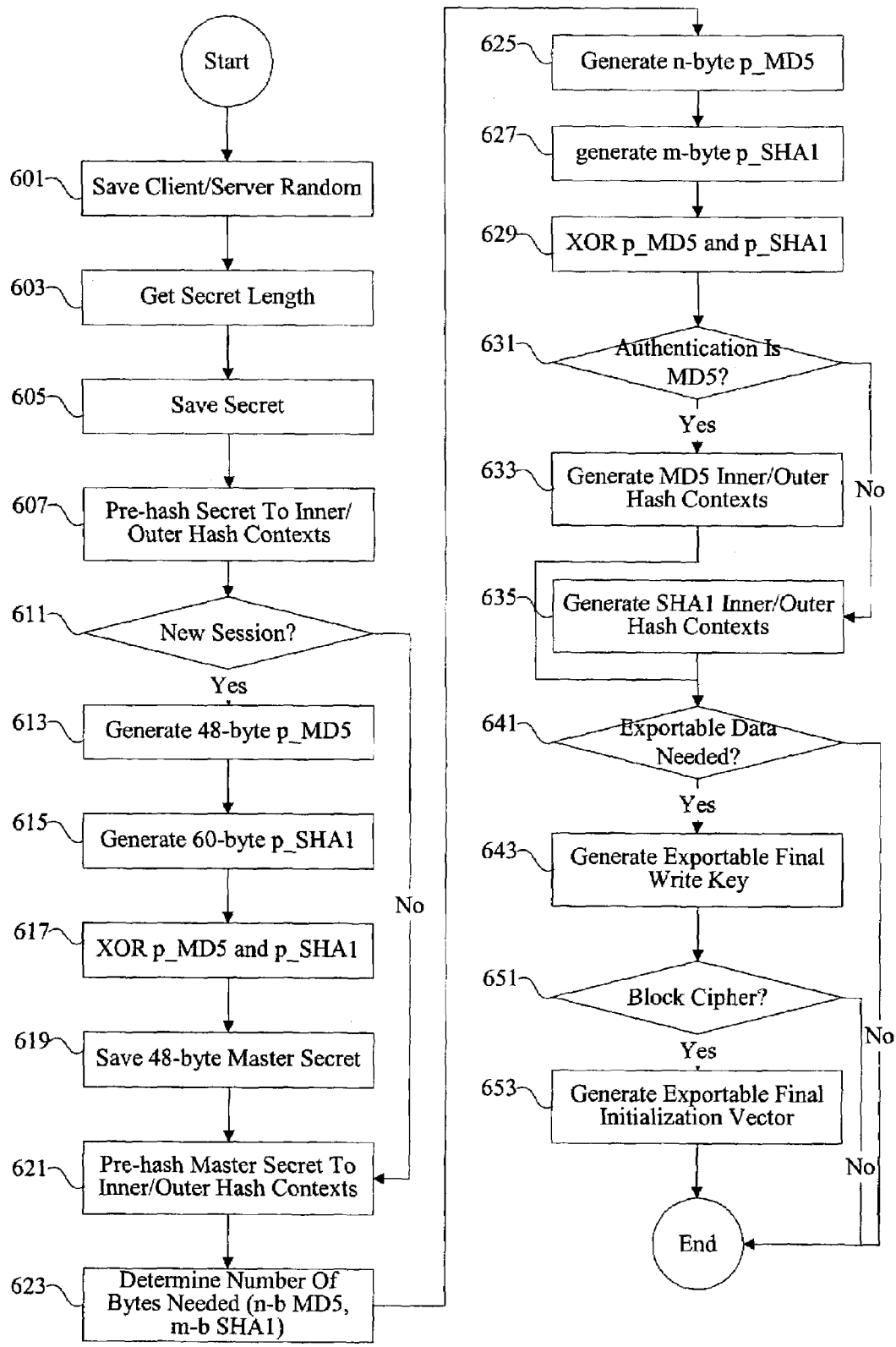
FIG. 6 is a flow process diagram showing TLS 1.0 key derivation.

FIG. 6 is a process flow diagram showing operations for performing TLS 1.0 key derivation according to various embodiments. TLS 1.0 key derivation can be used during a cryptography handshake sequence such as that shown in FIG. 3. A cryptography accelerator such as that shown in FIG. 2 having an MD5 core and a SHA-1 core can be used for key derivation. According to various embodiments, the inputs to the key derivation operations are a premaster secret, client random information, and server random information. At 601, client and server random information is saved. Client/server random information can be saved in a component such as temporary memory.

At 603, the length of the premaster secret is acquired. At 605, the premaster secret is saved. At 607, a prehash operation is performed on the premaster secret using the MD5 and a SHA-1 hash cores. At 611, it is determined if the current session is a new session. If the current session is a new session, a 48-byte p_MD5 is generated at 613, a 60-byte p_SHA-1 is generated at 615, and the resulting p_MD5 and p_SHA-1 are combined with an XOR operation to acquire the master secret key. The 48-byte master secret key is saved at 619. If it is determined at 611 that the current session is not a new session, the premaster secret to master secret generation is skipped.

At 621, a prehash is performed on the master secret. At 623, the number of bytes needed for the MD5 and SHA-1 operations is determined. The number of bytes needed can be determined by control logic, as the number of bytes needed may be one of the characteristics of the input data stream. Based on the number of bytes needed, MD5 and SHA-1 operations are performed at 625 and 627 using the MD5 and SHA-1 cores as configured by the control logic. The result is combined with an XOR at 629. According to various embodiments, the operations such as sending data to an XOR component are determined based on an instruction set selected by the control logic. A persistent memory allows storage of instruction sets for a variety of operations.

It is determined at 631 if authentication is MD5 or SHA-1. If authentication is MD5 at 631, MD5 inner and outer hash contexts are generated at 633. Otherwise, SHA-1 inner and outer hash contexts are generated at 635. It is determined at 641 whether exportable data is needed. In one example, export restrictions may limit the length of the key. If exportable data is needed, an exportable final write key is generated at 643. If exportable data is not needed, the process is completed. It is also determined at 651 whether the key is needed for a block cipher or a stream cipher. If the key is needed for a block cipher, an initialization vector that is exportable is generated at 653. Otherwise, the operations are complete for TLS 1.0 key derivation. It should be noted that when the operations are complete, data in temporary memory may be removed when the processed data is passed back to an external source. However, instructions sets for configuring the cryptography accelerator can remain in persistent memory.

Figure 7:
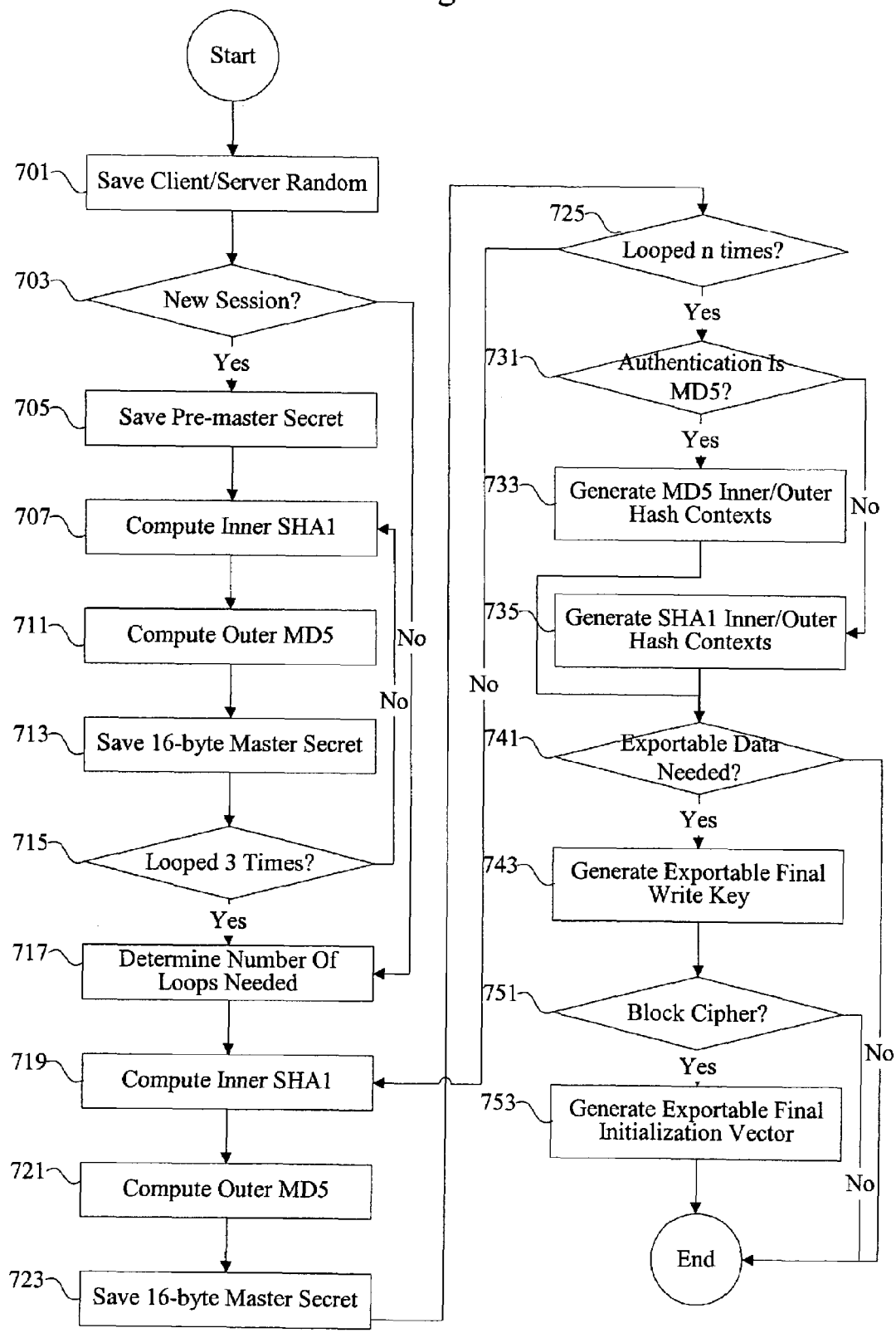
FIG. 7 is a flow process diagram showing SSLv3 key derivation.

FIG. 7 is a process flow diagram showing SSLv3 key derivation according to various embodiments. At 701, client and server random information is saved. At 703, it is determined whether the current session is a new session. If the current session is a new session, the master secret is generated by saving the premaster secret at 705, computing an inner hash using a SHA-1 component at 707, and computing an outer hash using an MD5 component at 71 1. A 16-byte master secret is saved at 713. The inner hash and outer hash computations are repeated three times at 715.

If the current session is not a new session, the number of loops needed is determined at 717. Control logic can determine the number of loops needed. The master secret is generated by computing an inner hash using a SHA-1 component at 719 and computing an outer hash using an MD5 component at 721. The master secret is saved at 723. The inner hash and outer hash computations are repeated based on the number of loops needed at 725.

It is determined at 731 if authentication is MD5 or SHA-1. If authentication is MD5 at 731, MD5 inner and outer hash contexts are generated at 733. Otherwise, SHA-1 inner and outer hash contexts are generated at 735. It is determined at 741 whether exportable data is needed. If exportable data is needed, an exportable final write key is generated at 743. If exportable data is not needed, the process is completed. It is also determined at 751 whether the key is needed for a block cipher or a stream cipher. If the key is needed for a block cipher, an initialization vector that is exportable is generated at 753. Otherwise, the operations are complete for SSLv3 key derivation.

Figure 8:
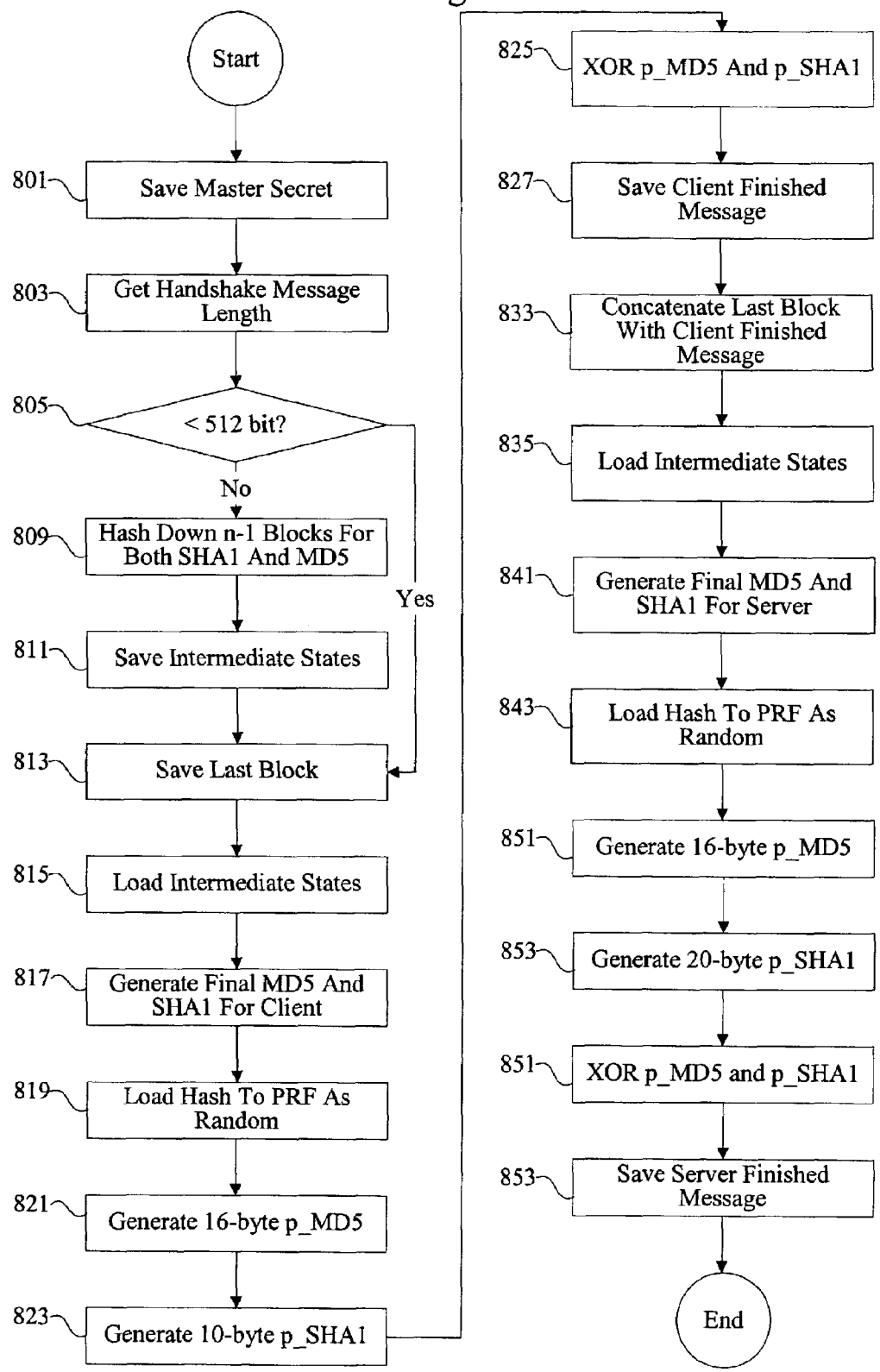
FIG. 8 is a flow process diagram showing TLS 1.0 finished message generation.

FIG. 8 is a flow processed diagram showing TLS 1.0 finished message generation, according to various embodiments. Finished message or verification messages are used to confirm that two network entities were successful in key exchange and authentication processes. The finished message is typically the first message associated with the recently negotiated algorithms, keys, and secret information. Network entities that receive finished messages verify that the contents are correct.

In one example, once a client has generated and sent its own finished message to a server and has received and validated a finished message from the server, the client can begin to send and receive application related data to the server. To generate a finished message according to TLS 1.0, the master secret is saved at 801. At 803, the length of the handshake message used for finished message generation is acquired. It is determined at 805 whether the handshake message length is less than 512 bits. If the handshake message length is not less than 512 bits, both SHA-1 and MD5 hash algorithms are performed on 512 bit blocks of the handshake message. At 811, intermediate states are saved. At 813, the last block of the handshake message is saved. If the handshake message length itself is less than 512 bits, the handshake message is simply saved at 813. At 815, the intermediate states are loaded.

At 817, a final MD5 and SHA-1 hash are performed. The resulting data is loaded at 819 into a pseudo-random function. At 821, a 16-byte p_MD5 hash is generated and at 823 at 10-byte SHA-1 hash is generated. The results are combined with an XOR at 825. The client finished message is saved at 827 and concatenated with the last block at 833. At 835, intermediate states are loaded and a final MD5 and SHA-1 hash are generated for the server. The resulting data is loaded at 843 into a pseudo-random function. A 16-byte p_MD5 hash is generated at 851 and a 20-byte SHA-1 hash is generated at 853. The result is combined with an XOR at 851. The server finished message is saved at 853.

Figure 9:
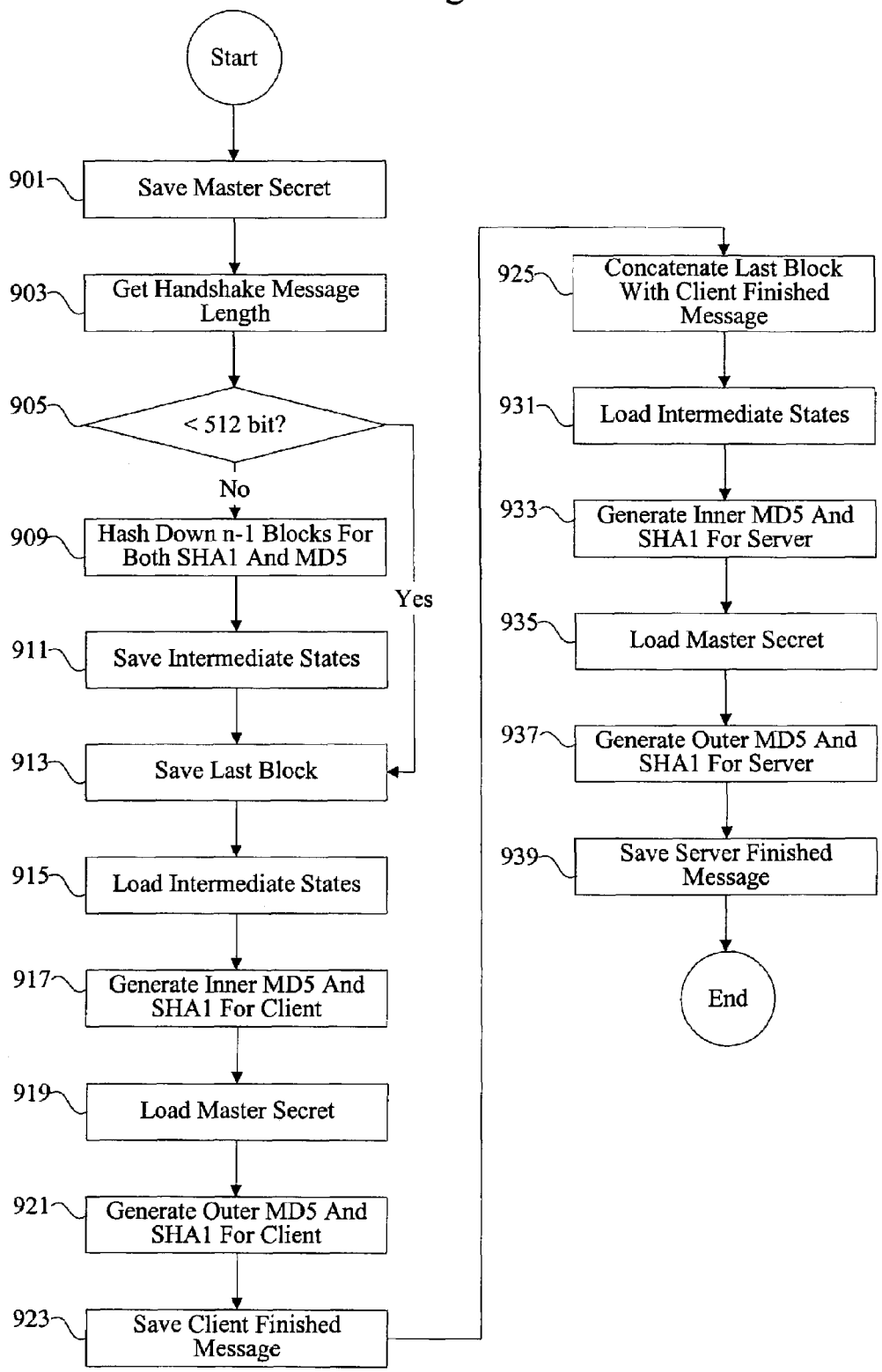
FIG. 9 is a flow process diagram showing SSLv3 finished message generation.

FIG. 9 is a flow process diagram showing finished message generation for SSLv3. At 901, the master secret is saved. At 903, the length of the handshake message is determined. It is determined at 905 whether the handshake message length is less than 512 bits. If the handshake message length is not less than 512 bits, both SHA-1 and MD5 hash algorithms are performed on 512 bit blocks of the handshake message. At 911, intermediate states are saved. At 913, the last block of the handshake message is saved. If the handshake message length itself is less than 512 bits, the handshake message is simply saved at 913. At 915, the intermediate states are loaded. At 917, a final MD5 and SHA-1 hash are performed.

At 919, the master secret is loaded. An outer MD5 hash and SHA-1 hash are generated for the client at 921. The client finished message is saved at 923 and concatenated with the last block at 925. Intermediate states are loaded at 931. An inner MD5 hash and SHA-1 hash are generated for the server at 933. The master secret is loaded at 935. At 937, an outer MD5 hash and SHA-1 hash are generated for the server. The server finished messages are saved at 939.

FIGS. 6-9 are process flow diagrams showing hash operations that can be performed according to various embodiments of the present invention. The operations can be performed using components such as hash cores, XOR components, and temporary memory configured using instruction sets maintained in persistent memory. It should be noted that the operations shown are specified for particular key derivation and finished message generation operations associated with TLS 1.0 and SSLv3. However, the techniques and mechanisms of the present invention should not be restricted to these two protocols and the specified versions of these two protocols.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A cryptography accelerator, the accelerator comprising:
   a first hash core that is configurable and operable to perform a plurality of rounds of hash computations on input data to derive processed data;
   a persistent memory containing a plurality of instruction sets, wherein the plurality of instruction sets configure the first hash core to enable operations on the input data and intermediate data during the plurality of rounds of hash computations, wherein one of said plurality of instruction sets is chosen for configuration of said first hash core on the basis of characteristics of said input data, said characteristics comprising at least one of a protocol version, a session ID, a compression method, and a cipher suite; and
   a temporary memory coupled to the first hash core, the temporary memory operable to hold input data and intermediate data.

2. The accelerator of claim 1, further comprising a second hash core, the second hash core configurable and operable to perform a plurality of rounds of hash computations on input data to derive processed data.

3. The accelerator of claim 2, wherein the first hash core is configurable to operate as either a SHA-1 or an MD5 hash core.

4. The accelerator of claim 2, wherein the second hash core is configurable to operate as either a SHA-1 or an MD5 hash core.

5. The accelerator of claim 4, wherein the first hash core is configured as the inner hash and the second hash core is configured as the outer hash for HMAC operations.

6. The accelerator of claim 2, further comprising control logic operable to determine characteristics associated with the input data and select an instruction set based on the input data characteristics.

7. The accelerator of claim 6, wherein the control logic configures the first hash core using the instruction set.

8. The accelerator of claim 7, wherein the control logic configures the second hash core using the instruction set.

9. The accelerator of claim 6, wherein the control logic is configured to manage the first hash core using the instruction set.

10. The accelerator of claim 9, wherein the control logic is configured to manage the second hash core using the instruction set.

11. The accelerator of claim 1, wherein the characteristics of the input data further comprise information associated with a premaster sequence, an initialization vector, export information, and key length.

12. The accelerator of claim 11, wherein the characteristics of the input data further comprise information associated with how encryption and authentication will be performed.

13. The accelerator of claim 1, wherein the plurality of instruction sets in persistent memory comprise instructions for performing TLS 1.0 and SSLv3 key derivation and finished message generation.

14. The accelerator of claim 13, wherein the persistent memory and the temporary memory are provided in the same component.

15. A method for performing hash operations, the method comprising:
  receiving input data;
  determining characteristics of the input data, the characteristics comprising at least one of a protocol version, a session ID, a compression method, and a cipher suite;
  on the basis of the characteristics, selecting an instruction set for performing hash operations on the input data, wherein the instruction set is selected from a plurality of instruction sets maintained in persistent memory associated with a first hash core;
  configuring the first hash core using the instruction set, wherein the first hash core is operable to perform one or more hash operations on the input data based on the instruction set, thereby creating intermediate data;
  storing the intermediate data in a temporary memory; and
  performing, in the first hash core, one or more additional hash operations on the intermediate data.

16. The method of claim 15, further comprising:
  configuring a second hash core using the instruction set, wherein the second hash core is operable to perform the hash operations on the input data based on the instruction set.

17. The method of claim 16, wherein performing the hash operations on the input data comprises performing a plurality of rounds of hash computations on the input data to derive the intermediate data and processed data.

18. The method of claim 16, wherein the first hash core is a SHA-1 hash core.

19. The method of claim 18, wherein the second hash core is a MD5 hash core.

20. The method of claim 19, wherein the selected instruction set comprises instructions for performing key derivation or finished message generation.

21. The method of claim 16, wherein the first hash core is configured as the inner hash and the second hash core is configured as the outer hash for HMAC operations.

22. The method of claim 15, wherein the characteristics of the input data further comprise information associated with a premaster sequence, an initialization vector, export information, and key length.

23. The method of claim 22, wherein the characteristics of the input data further comprise information associated with how encryption and authentication will be performed.

24. An apparatus for performing hash operations, the apparatus comprising:
  means for receiving input data;
  means for determining characteristics of the input data, the characteristics comprising at least one of a protocol version, a session ID, a compression method, and a cipher suite;
  means for selecting, on the basis of the characteristics, an instruction set for performing hash operations on the input data, wherein the instruction set is selected from a plurality of instruction sets maintained in persistent memory associated with a first hash core;
  means for configuring the first hash core using the instruction set, wherein the first hash core is operable to perform one or more hash operations on the input data based on the instruction set to create intermediate data;
  means for storing the intermediate data in a temporary memory; and
  means for transferring the intermediate data from the temporary memory to the first hash core for performing additional hash operations on the intermediate data.

25. The apparatus of claim 24, further comprising:
  means for configuring a second hash core using the instruction set, wherein the second hash core is operable to perform the hash operations on the input data based on the instruction set.

26. The apparatus of claim 25, wherein performing the hash operations on the input data comprises performing a plurality of rounds of hash computations on the input data to derive the intermediate data and processed data.

27. The apparatus of claim 25, wherein the first hash core is a SHA-1 hash core.

28. The apparatus of claim 27, wherein the second hash core is a MD5 hash core.

29. The apparatus of claim 28, wherein the selected instruction set comprises instructions for performing key derivation or finished message generation.

30. The apparatus of claim 25, wherein the first hash core is configured as the inner hash and the second hash core is configured as the outer hash for HMAC operations.

31. The apparatus of claim 24, wherein the characteristics of the input data further comprise information associated with a premaster sequence, an initialization vector, export information, and key length.

32. The apparatus of claim 31, wherein the characteristics of the input data further comprise information associated with how encryption and authentication will be performed.

* * * * *